(12) United States Patent
Byun et al.

(10) Patent No.: US 11,336,871 B2
(45) Date of Patent: May 17, 2022

(54) IMAGE DEVICE

(71) Applicant: SAMSUNG ELECTRONICS CO., LTD., Suwon-si (KR)

(72) Inventors: Keun Yung Byun, Suwon-si (KR); Chae Sung Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/925,696

(22) Filed: Jul. 10, 2020

(65) Prior Publication Data

US 2021/0120214 A1    Apr. 22, 2021

(30) Foreign Application Priority Data

Oct. 21, 2019    (KR) .................... 10-2019-0130513

(51) Int. Cl.
| | |
|---|---|
| *H04N 5/347* | (2011.01) |
| *H04N 5/374* | (2011.01) |
| *H04N 9/04* | (2006.01) |
| *G06T 3/40* | (2006.01) |
| *G06T 7/90* | (2017.01) |

(Continued)

(52) U.S. Cl.
CPC .......... *H04N 9/0455* (2018.08); *H04N 5/347* (2013.01); *H04N 5/37457* (2013.01)

(58) Field of Classification Search
CPC .. H04N 5/347; H04N 5/37457; H04N 9/0455; H04N 3/14; H04N 1/6008; H04N 1/6077; H04N 1/64; H04N 9/04557; H04N 9/04515; H04N 9/64; G06T 3/4015;

(Continued)

(56) References Cited

U.S. PATENT DOCUMENTS 7,745,779 B2    6/2010    Conners
8,063,350 B2 *  11/2011    McGarry ............. H04N 5/3555
                                                           250/208.1

(Continued)

FOREIGN PATENT DOCUMENTS

WO    2014/083489 A1    6/2014

OTHER PUBLICATIONS

Communication dated Feb. 22, 2021 by the European Patent Office in European Application No. 20202127.5.

*Primary Examiner* — Marly S Camargo
(74) *Attorney, Agent, or Firm* — Sughrue Mion, PLLC

(57) ABSTRACT

An image device is provided. The image device includes a pixel array comprising a first pixel array portion of a part of the pixel array and a second pixel array portion of other part of the pixel array that outputs an image; and a color filter array disposed over the pixel array, the color filter array comprising a first color filter pattern on the first pixel array portion and a second color filter pattern on the second pixel array portion, which are comprising a plurality of different color filters in each of the first pixel array portion and the second pixel array portion, wherein the plurality of the color filters in the first color filter pattern is arranged in an array of N*N and the plurality of the color filters in the second color filter pattern is arranged in an array of M*M (N and M are a natural number of 2 or more, and the N and M is different each other) wherein a number of red (R) color filters included in the first color filter pattern is equal to a number of R color filters included in the second color filter pattern.

20 Claims, 21 Drawing Sheets

(51) Int. Cl.
*G06T 9/00* (2006.01)
*G06K 7/10* (2006.01)
*G06K 9/00* (2022.01)
*H01L 27/146* (2006.01)
*H04N 5/3745* (2011.01)

(58) Field of Classification Search
CPC .......... G06T 3/4038; G06T 7/90; G06T 9/00; G06K 7/10; G06K 9/00234; H01L 27/14621
USPC ......... 348/273, 294, 222.1, 308, 34, 210.99, 348/223.1, 234, 237, 260, 263, 266, 268, 348/271, 272, 277, 279, 280, 391, 239, 348/398.1; 382/162, 164, 165, 167; 257/9, 291, 292, 293, 258, 294, 440, 89; 250/208.1, 226, 553
See application file for complete search history.

(56) References Cited

U.S. PATENT DOCUMENTS

| | | |
|---|---|---|
| 8,493,482 B2 | 7/2013 | Cote et al. |
| 9,083,900 B2 | 7/2015 | Chen |
| 9,521,385 B2 | 12/2016 | Chen et al. |
| 10,178,329 B2 | 1/2019 | Vogelsang et al. |
| 10,257,447 B2 | 4/2019 | Zhou |
| 2006/0283952 A1 | 12/2006 | Wang |
| 2009/0200451 A1* | 8/2009 | Conners .................... G01J 3/50 250/208.1 |
| 2010/0097505 A1* | 4/2010 | Meisenzahl ............ H04N 5/335 348/273 |
| 2014/0253808 A1* | 9/2014 | Tachi ....................... H04N 9/64 348/624 |
| 2018/0152646 A1 | 5/2018 | Tang |
| 2018/0316898 A1 | 11/2018 | Kaneko et al. |
| 2018/0357750 A1 | 12/2018 | Chen et al. |
| 2020/0396388 A1* | 12/2020 | Kim ................. H04N 5/232122 |

* cited by examiner

FIG.6

| | C1 | C2 | C3 | C4 | C5 | C6 | C7 |
|---|---|---|---|---|---|---|---|
| R1 | P1 | P2 | P3 | P4 | P5 | P6 | P7 |
| R2 | P101 | P102 | P103 | P104 | P105 | P106 | P107 |
| R3 | P201 | P202 | P203 | P204 | P205 | P206 | P207 |
| R4 | P301 | P302 | P303 | P304 | P305 | P306 | P307 |
| R5 | P401 | P402 | P403 | P404 | P405 | P406 | P407 |
| R6 | P501 | P502 | P503 | P504 | P505 | P506 | P507 |
| R7 | P601 | P602 | P603 | P604 | P605 | P606 | P607 |

|  | B | | | B' |
|---|---|---|---|---|
| R2_1 | R | R | Gr | Gr |
| R2_2 | R | R | Gr | Gr |
| R2_3 | Gb | Gb | B | B |
| R2_4 | Gb | Gb | B | B |

| | C | | | | | C' |
|---|---|---|---|---|---|---|
| R13_1 | R | R | R | Gr | Gr | Gr |
| R13_2 | R | R | R | Gr | Gr | Gr |
| R13_3 | R | R | R | Gr | Gr | Gr |
| R13_4 | Gb | Gb | Gb | B | B | B |
| R13_5 | Gb | Gb | Gb | B | B | B |
| R13_6 | Gb | Gb | Gb | B | B | B |

C4_1　C4_2　C4_3　C4_4　C4_5　C4_6

IMAGE DEVICE

CROSS-REFERENCE TO RELATED APPLICATION

This application claims priority from Korean Patent Application No. 10-2019-0130513 filed on Oct. 21, 2019 in the Korean Intellectual Property Office, the entire contents of which is herein incorporated by reference in its entirety.

BACKGROUND

1. Field

The present disclosure relates to an image device.

2. Description of the Related Art

An image sensor in an image device and/or system may digitally capture an image of a subject using light entering through a wide-angle lens. Image sensors in the image device and/or system may be classified into a charge coupled device (CCD) type and a complementary metal oxide semiconductor (CMOS) type. A CMOS type image sensor is abbreviated as CIS. The CIS includes a plurality of pixels arranged two-dimensionally. Each of the pixels includes a photodiode. The photodiode converts incident light into an electrical signal.

Recently, with the development of the computer and communication industries, a demand for image sensors with improved performance has increased for a variety of applications such as a digital camera, a camcorder, a personal communication system (PCS), a game device, a surveillance camera, a medical micro camera and a robot. In addition, as semiconductor devices have become highly integrated, image sensors may also become highly integrated.

SUMMARY

It is an aspect to provide an image device with improved reliability.

According to an aspect of an example embodiment, there is provided an image device comprising a pixel array comprising a first pixel array portion of a part of the pixel array and a second pixel array portion of other part of the pixel array that outputs an image; and a color filter array disposed over the pixel array, the color filter array comprising a first color filter pattern on the first pixel array portion and a second color filter pattern on the second pixel array portion, which are comprising a plurality of different color filters in each of the first pixel array portion and the second pixel array portion, wherein the plurality of the color filters in the first color filter pattern is arranged in an array of N×N and the plurality of the color filters in the second color filter pattern is arranged in an array of M×M (N and M are a natural number of 2 or more, and the N and M is different each other) wherein a number of red (R) color filters included in the first color filter pattern is equal to a number of R color filters included in the second color filter pattern.

According to another aspect of an example embodiment, there is provided an image device comprising a pixel array comprising a first pixel array portion of a center of the pixel array and a second pixel array portion of a surrounding the center of the pixel array; a color filter array disposed on top of the pixel array, the color filter array comprising a first pattern region corresponding to the first pixel array portion and a second pattern region corresponding to the second pixel array portion, the first pattern region including a first color filter pattern having a first pattern and the second pattern region including a second color filter pattern having a second pattern different from the first pattern, wherein the first color filter pattern are arranged in an array of N×N repeated color filter pattern, and the second color filter pattern are arranged in an array of M×M repeated color filter pattern, wherein N is a natural number greater than 1, and M is a natural number greater than N, and wherein the first pattern region and the second pattern region include R and B color filters, respectively.

According to another aspect of an example embodiment, there is provided an image device comprising a pixel array; and a color filter array disposed on top of the pixel array, the color filter array comprising a first pattern region located at a center and having a first pattern, a second pattern region surrounding the first pattern region and having a second pattern different from the first pattern, and a third pattern region surrounding the second pattern region and having a third pattern different from the first pattern and the second pattern, wherein the first pattern region includes an array of N×N repeated color filter pattern, the second pattern region includes an array of M×M repeated color filter pattern, and the third pattern region includes an array of T×T repeated color filter pattern, and wherein each of N, M and T is a natural number greater than 1.

According to another aspect of an example embodiment, there is provided an pixel array that outputs an image; and a color filter array disposed on top of the pixel array, the color filter array comprising a first pattern region corresponding to a center portion of the pixel array and having color filters arranged in a first pattern, and a second pattern region corresponding to an edge portion of the pixel array and having color filters arranged a second pattern different than the first pattern.

BRIEF DESCRIPTION OF THE DRAWINGS

The above and other aspects will become more apparent by describing in detail exemplary embodiments thereof with reference to the attached drawings, in which:

FIG. 6 is a plan view illustrating an arrangement of pixel regions of a pixel array of the image sensor of FIG. 4, according to some embodiments;

FIG. 10 is an exemplary plan view illustrating a second pattern region II of FIG. 7;

FIG. 15 is an exemplary plan view illustrating a third pattern region III of the color filter array of FIG. 14, according to some embodiments;

DETAILED DESCRIPTION

Aspects of the present disclosure are not restricted to the ones set forth herein. The above and other aspects of the present disclosure will become more apparent to one of ordinary skill in the art to which the present disclosure pertains by referencing the detailed description given below.

Figure 1:
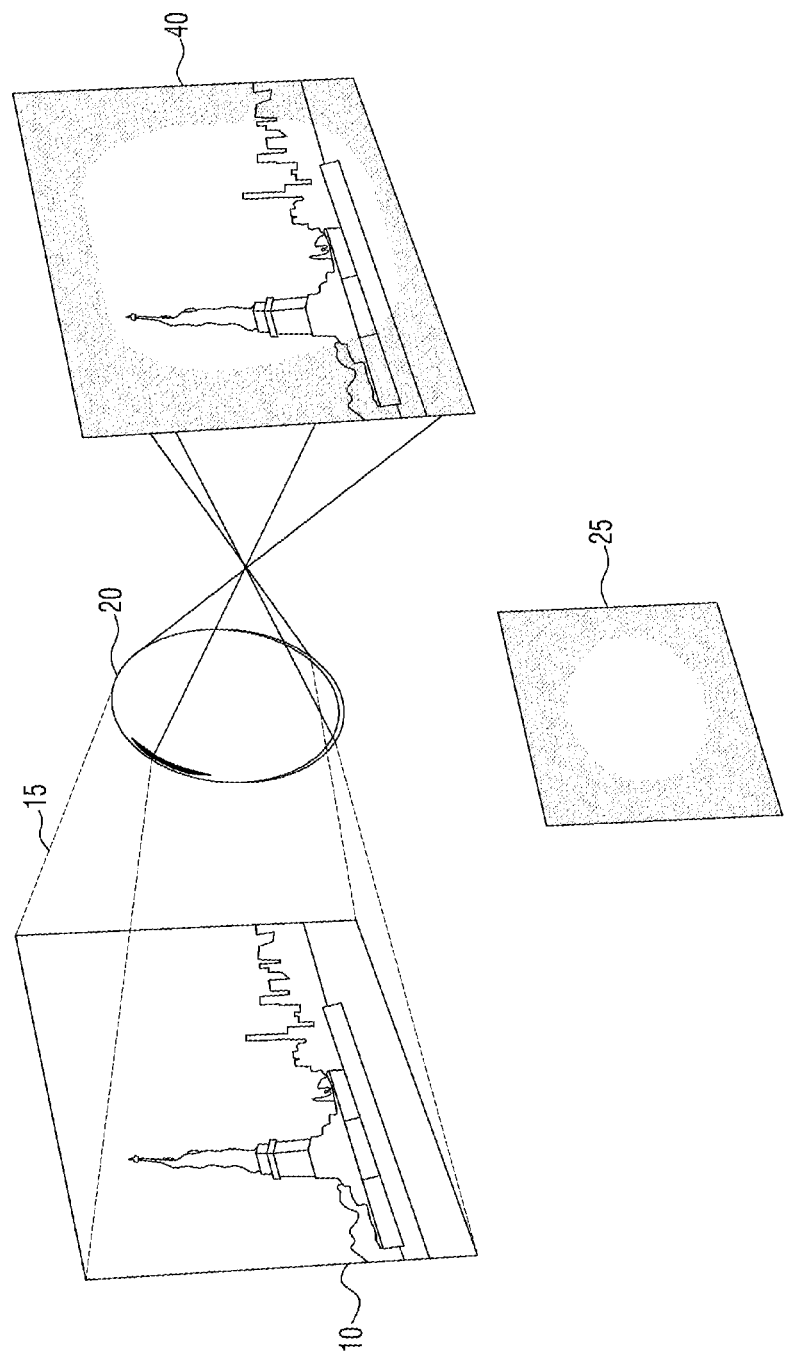
FIG. 1 is an exemplary diagram explaining lens shading.

FIG. 1 is an exemplary diagram explaining lens shading.

Referring to FIG. 1, an imaging device and/or system includes a wide-angle lens 20 through which light 15 from a subject 10 is incident.

The wide-angle lens 20 may have a curved shape at a periphery thereof. That is, after being reflected from the subject 10, the amount of light 15 incident on the edge of the wide-angle lens 20 may be smaller than the amount of light 15 incident on the center of the wide-angle lens 20.

This can be easily seen from a simplified diagram 25 in plan view. That is, the amount of light (e.g., luminance) of an edge portion EP of a captured image 40 entering the imaging device and/or system through the wide-angle lens 20 may be smaller than that of a central portion CP of the captured image 40.

In order to correct this phenomenon, various methods may be used. As one of various method, lens shading correction (LSC) will be described with reference to FIG. 2.

Figure 2:
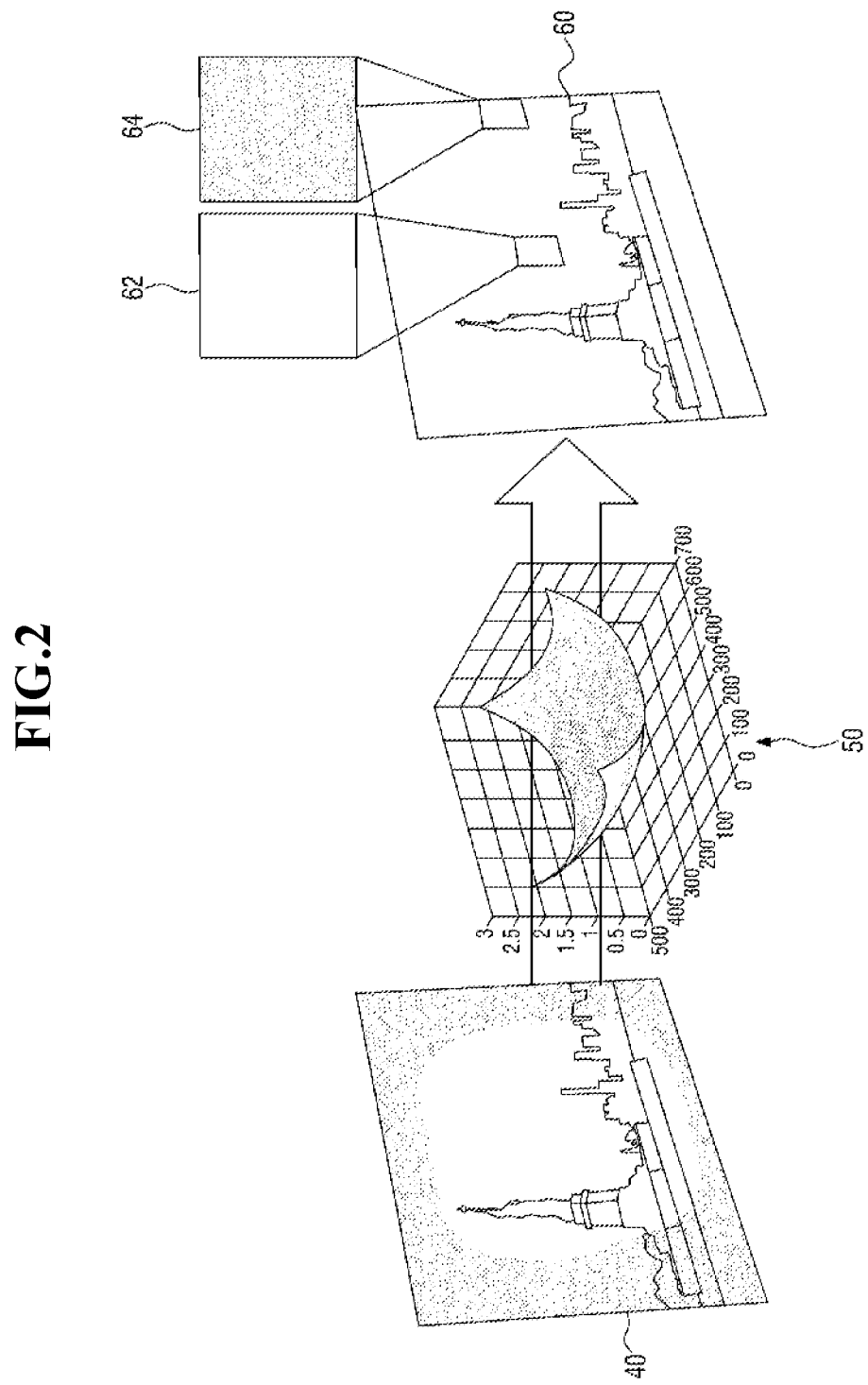
FIG. 2 is an exemplary diagram explaining lens shading correction.

FIG. 2 is an exemplary diagram explaining lens shading correction.

Referring to FIGS. 1 and 2, lens shading correction may be performed as an example for correcting the image 40 captured through the wide-angle lens 20.

As described above, due to the curved shape of the edge of the wide-angle lens 20, the amount of light may be insufficient at the edge portion of the captured image 40, which may cause lens shading (or sensitivity non-uniformity) of the captured image 40.

In particular, in the case of a mobile camera, since the number of pixels is large and the size of a lens is small, lens shading may be more prominent. Accordingly, the captured image 40 may be divided into a plurality of blocks, and stored in a memory by applying different weight values 50 to central portion and edge portions of each block. Then, lens shading correction may be performed using the stored values. A detailed description thereof is disclosed in U.S. Patent Application Publication No. 2007-285552 titled "Lens Shading Correction Device and Method in Image Sensor."

However, the noise included in the captured image 40 is amplified together with the weight value 50 used in the lens shading correction. In other words, the noise is less amplified after multiplying the weight value 50 for a center portion 62 of the captured image 40. However, after multiplying the weighted value 50 for an edge portion 64 of the captured image 40, the noise may be significantly amplified. Thus, when an environment for capturing the subject 10 has low illuminance, the image quality of the captured image 40 may be greatly deteriorated.

Therefore, in order to prevent noise amplification according to the weight value 50 used for the lens shading correction, the noise of the edge portion 64 of the previously captured image 40 should be reduced before the lens shading correction.

In some of methods for reducing the noise of the edge portion 64, the noise of the edge portion 64 is reduced based on the information of the same color filter pixels of the edge portion 64.

However, an image sensor in an image device and/or image system generally uses a Bayer pattern for color filter pixels. That is, in the case of the Bayer pattern, the same color filter pixels are not adjacent to each other, which may reduce spatial correlation causing a limitation in reducing the noise.

Therefore, in an image device and/or image system according to some embodiments disclosed herein, a large pattern such as a tetra, nona, or hexa-deca pattern is used at the edges of a color filter array. Accordingly, it is possible to reduce noise in the captured image 40 more efficiently by using a color filter array including a pattern in which the same color filter pixels are adjacent to each other. Hereinafter, an image device according to some embodiments will be described in detail.

Figure 3:
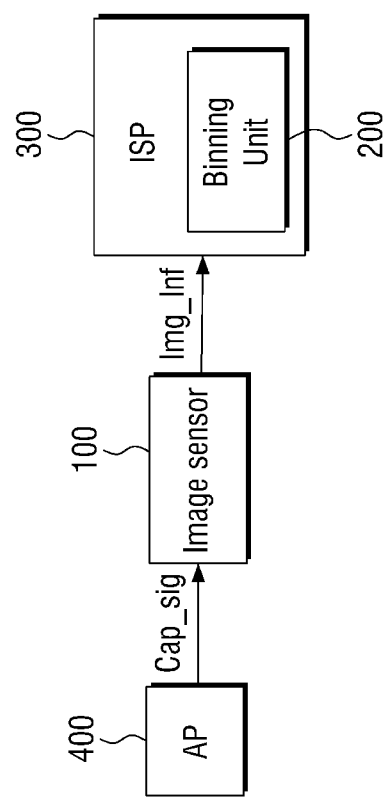
FIG. 3 is an exemplary block diagram illustrating an image system according to some embodiments.
Figure 4:
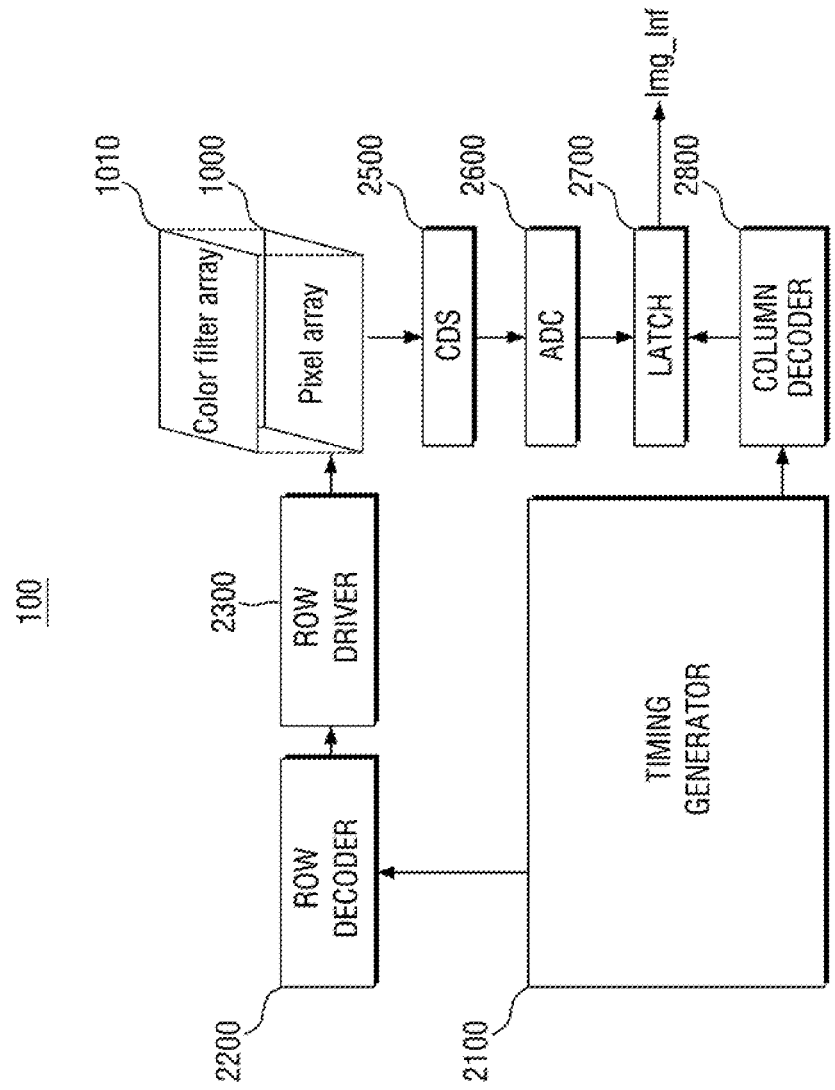
FIG. 4 is an exemplary block diagram illustrating an image sensor of the image system of FIG. 3, according to some embodiments.

FIG. 3 is an exemplary block diagram illustrating an image system according to some embodiments. FIG. 4 is an exemplary block diagram illustrating an image sensor of the image system of FIG. 3.

Referring to FIGS. 3 and 4, an image system according to some embodiments may include an application processor (AP) 400, an image sensor 100, a binning unit 200 and an image signal processor (ISP) 300. The application processor (AP) 400 may include one or more microprocessors.

In some embodiments, the image sensor 100 may include a color filter array 1010, a pixel array 1000 disposed below the color filter array 1010, and peripheral circuits for driving the pixel array 1000. The peripheral circuits may drive the pixel array 1000 through a capture signal Cap_sig received from the application processor 400.

The image signal processor 300 may receive image information Img_Inf received from the image sensor 100 to perform binning, remosaic, and/or upscale operations, but the operation of the image signal processor 300 is not limited thereto.

The binning unit 200 included in the image signal processor 300 may determine whether to perform the binning of the pixel array 100. The image signal processor (ISP) 300 may include one or more processors and a memory storing computer code which, when executed, implement the function of the binning unit 200. In other embodiments, the binning unit 200 may be provided as a hardware circuit.

More specifically, the image sensor 100 may include a timing generator 2100, a row decoder 2200, a row driver 2300, a correlated double sampler (CDS) 2500, an analog-to-digital converter (ADC) 2600, a latch 2700, a column decoder 2800 and the like, but the configuration of the image sensor 100 is not limited thereto.

The pixel array 1000 is driven by receiving a plurality of driving signals such as a row selection signal, a reset signal and a charge transfer signal from the row driver 2300. Further, a converted electrical output signal is provided to the correlated double sampler 2500 via a vertical signal line. The timing generator 2100 provides a timing signal and a control signal to the row decoder 2200 and the column decoder 2800.

The row driver 2300 provides the pixel array 1000 with a plurality of driving signals to drive a plurality of unit pixels according to the decoding result of the row decoder 2200. In general, when unit pixels are arranged in a matrix, a driving signal is provided to each row.

The correlated double sampler 2500 receives an output signal from the pixel array 1000 through a vertical signal line, and holds and samples the received signal. That is, the correlated double sampler 2500 double-samples a certain noise level and a signal level according to the output signal, and outputs a difference level corresponding to a difference between the noise level and the signal level. The analog-to-digital converter 2600 converts an analog signal corresponding to the difference level into a digital signal, and outputs the digital signal.

The correlated double sampler 2500 may receive digital information from the pixel array of a Bayer pattern and output a value of another pattern such as a tetra pattern or a nona pattern.

The latch 2700 may latch the digital signal into the image information Img_Inf. The latched image information Img_Inf may be sequentially outputted to the image signal processor 300 according to the decoding result of the column decoder 2800.

Figure 5:
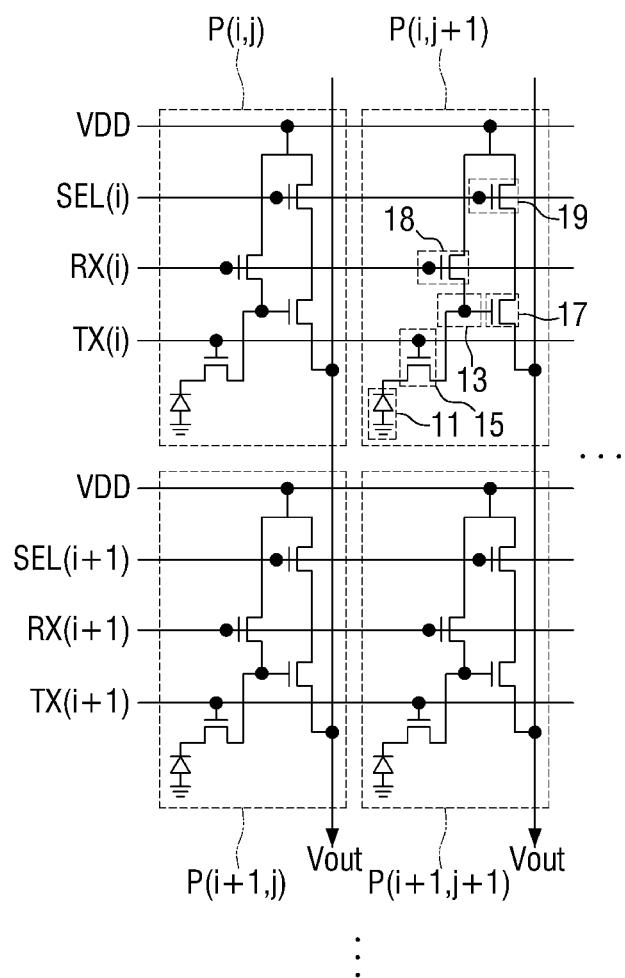
FIG. 5 is an equivalent circuit diagram of a pixel array of the image sensor of FIG. 4, according to some embodiments.

FIG. 5 is an equivalent circuit diagram of the pixel array of the image sensor 100 of FIG. 4, according to some embodiments.

Referring to FIG. 5, pixels P are arranged in a matrix to form the pixel array 1000. Each of the pixels P includes a photoelectric transistor 11, a floating diffusion region 13, a charge transfer transistor 15, a drive transistor 17, a reset transistor 18, and a select transistor 19. The functions of the photoelectric transistor 11, the floating diffusion region 13, the charge transfer transistor 15, the drive transistor 17, the reset transistor 18, and the select transistor 19 will be described with respect to the pixels P (i, j), P (i, j+1), P (i, j+2), P (i, j+3), . . . arranged in the $i^{th}$ row.

The photoelectric transistor 11 absorbs incident light and accumulates charges corresponding to the quantity of light. As the photoelectric transistor 11, a photodiode, a phototransistor, a photogate, a pinned photodiode, or a combination thereof may be employed. In FIG. 5, according to an embodiment, a photodiode is illustrated as an example of the photoelectric transistor 11.

Each photoelectric transistor 11 is coupled with each charge transfer transistor 15 which transfers the accumulated charges to the floating diffusion region 13. The floating diffusion region 13 converts the charges into a voltage, and has a parasitic capacitance so that the charges are stored cumulatively.

The drive transistor 17 illustrated as a source follower amplifier amplifies a change in the electrical potential of the floating diffusion region 13 which receives the charges accumulated in each photoelectric transistor 11 and outputs the accumulated charges to an output line Vout.

The reset transistor 18 periodically resets the floating diffusion region 13. The reset transistor 18 may be formed of a single MOS transistor which is driven by a bias provided via a reset line RX(i) for applying a predetermined bias (i.e., a reset signal). When the reset transistor 18 is turned on by the bias provided via the reset line RX(i), a predetermined electric potential (e.g., a source voltage VDD) provided to the drain of the reset transistor 18 is transmitted to the floating diffusion region 13.

The select transistor 19 serves to select pixels P to be read on a row basis. The select transistor 19 may be formed of a signal MOS transistor which is driven by a bias (e.g., a row selection signal) provided via a row selection line SEL(i). When the select transistor 19 is turned on by the bias provided via the row selection line SEL(i), a predetermined electric potential (e.g., the source voltage VDD) provided to the drain of the select transistor 19 is transmitted to the drain region of the drive transistor 17.

A transfer line TX(i) for applying a bias to the charge transfer transistor 15, the reset line RX(i) for applying a bias to the reset transistor 18, and the selection line SEL(i) for applying a bias to the select transistor 19 may be arranged to extend substantially in parallel with each other in a row direction.

FIG. 6 is a plan view illustrating an arrangement of pixel regions of the pixel array of the image sensor of FIG. 4, according to some embodiments.

Referring to FIG. 6, the pixel array 1000 may include a plurality of pixel regions P1 to P7, P101 to P107, P201 to P207, P301 to P307, P401 to P407, P501 to P507, and P601 to P607.

The plurality of pixel regions P1 to P7, P101 to P107, P201 to P207, P301 to P307, P401 to P407, P501 to P507, and P601 to P607 may be defined as a plurality of rows and a plurality of columns. Although FIG. 6 illustrates only 49 pixel regions of 7 rows and 7 columns, only some pixel regions are illustrated for simplicity and conciseness of description, and embodiments are not limited thereto. That is, the number of pixel regions may be applied differently.

Row signal lines R1 to R7 may be connected to the respective rows of the plurality of pixel regions P1 to P7, P101 to P107, P201 to P207, P301 to P307, P401 to P407, P501 to P507, and P601 to P607. Each of the row signal lines R1 to R7 may correspond to the row selection line SEL(i) of FIG. 5. That is, a signal may be applied to the entire pixel regions of the row through one of the row signal lines R1 to R7.

Column signal lines C1 to C7 may be connected to the respective columns of the plurality of pixel regions P1 to P7, P101 to P107, P201 to P207, P301 to P307, P401 to P407, P501 to P507, and P601 to P607. Each of the column signal lines C1 to C7 may correspond to the output line Vout of FIG. 5. That is, a signal may be outputted to the pixel regions of the column through one of the column signal lines C1 to C7.

On top of the pixel array 1000, a color filter array 1010 may be disposed. The color filter array 1010 may use a large pattern such as a tetra, nona, or hexa-deca pattern at the edge portion thereof. A color filter array 1010 according to some embodiments will be described in detail with reference to FIG. 7.

Figure 7:
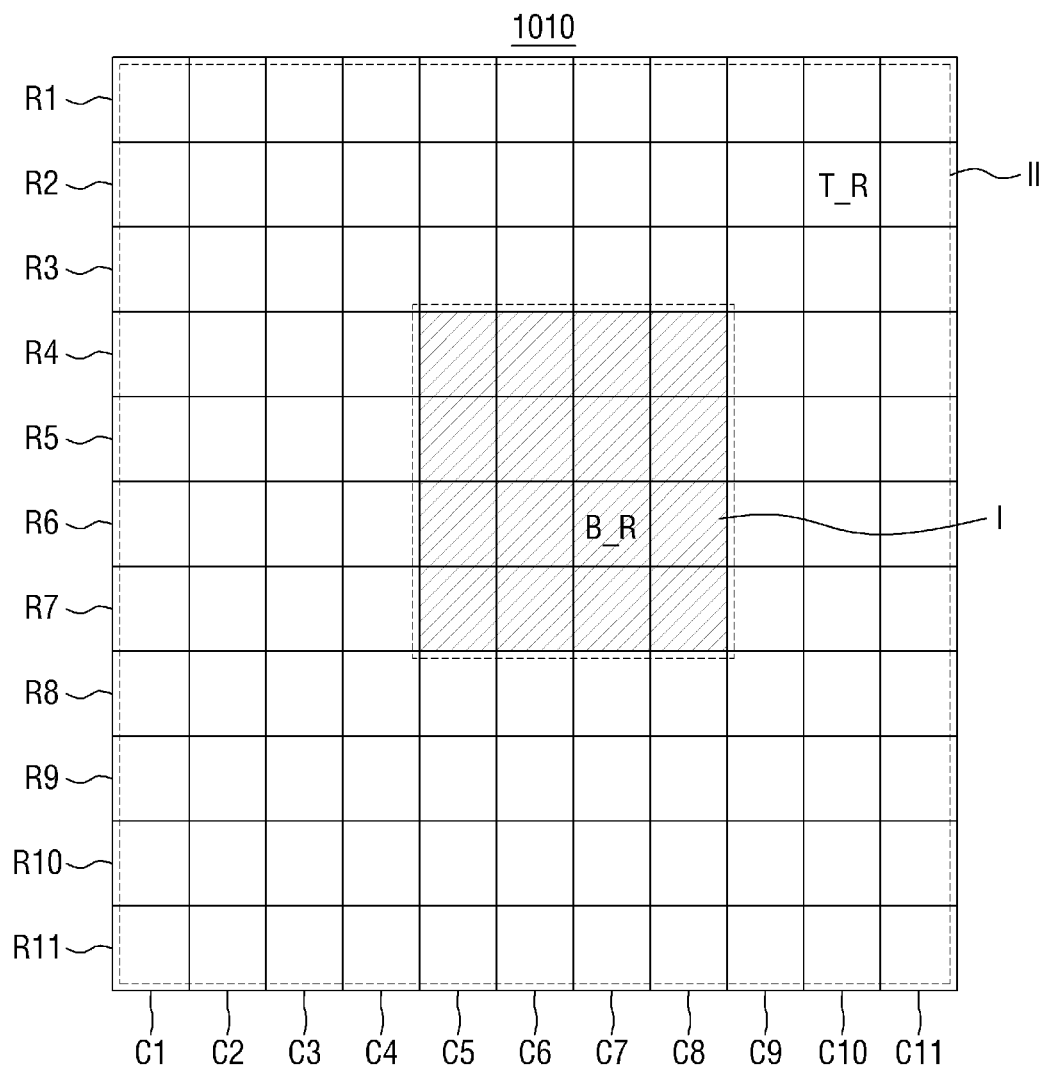
FIG. 7 is an exemplary conceptual diagram in plan view, explaining a color filter array of the image sensor of FIG. 4, according to some embodiments.

FIG. 7 is an exemplary conceptual diagram in plan view explaining a color filter array of the image sensor of FIG. 4, according to some embodiments.

Referring to FIG. 7, according to some embodiments, the color filter array 1010 may include a first pattern region I forming a central portion of the color filter array and a second pattern region II forming an edge portion corresponding to a remaining portion of the color filter array except for the first pattern region I.

Although only an array of 121 color filters is shown in FIG. 7, only some color filters are illustrated for simplicity and conciseness of description, and embodiments are not limited thereto. The number of filters in the color filter array 1010 may be applied differently. For example, it is noted that the color filter array 1010 of FIG. 7 assumes a corresponding pixel array 1000 of 11 rows and 11 columns, i.e., including rows R1 to R11 and columns C1 to C11.

The color filters of the color filter array 1010 may be disposed on the pixel array 1000 and connected to row signal lines R1 to R11 and column signal lines C1 to C11. The first pattern region I of the color filter array 1010 according to some embodiments may be configured as a Bayer pattern, and the second pattern region II of the color filter array 1010 may be configured as a tetra pattern. Without being limited thereto, the first pattern region I may be configured as a tetra pattern, and the second pattern region II may be configured as a Bayer pattern. Alternatively, a nona pattern may be used instead of the tetra pattern. The configuration pattern of each pattern region is not limited thereto.

The color filter array of the first pattern region I may have N×N (N is a natural number of 2 or more) color filter pattern, and the color filter array of the second pattern region II may have M×M (M is a natural number of 2 or more) color filter pattern. In this configuration, in some embodiments, the number of red (R) color filters in the first pattern region I may be equal to the number of R color filters in the second pattern region II. Alternatively or additionally, in other embodiments, the number of blue (B) color filters in the first pattern region I may be equal to the number of B color filters in the second pattern region II. Alternatively or additionally, in yet other embodiments, the number of green (G) color filters in the first pattern region I may be equal to the number of G color filters in the second pattern region II.

Alternatively or additionally, in some other embodiments, the number of B color filters in the first pattern region I may be equal to the number of R color filters in the second pattern region II, and the number of R color filters in the first pattern region I may be equal to the number of B color filters in the second pattern region II, but embodiments are not limited thereto.

Figure 8:
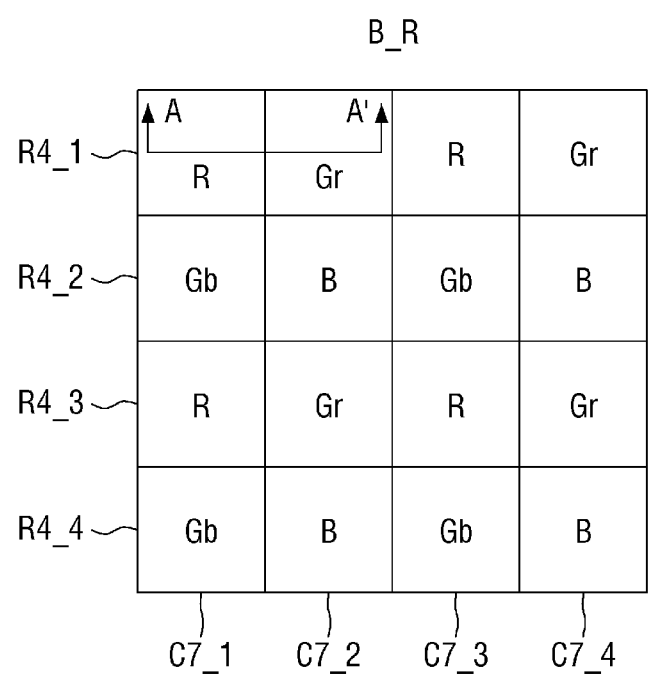
FIG. 8 is an exemplary plan view illustrating a first pattern region I of the color filter array of FIG. 7, according to some embodiments.

FIG. 8 is an exemplary plan view illustrating the first pattern region I of the color filter array of FIG. 7, according to some embodiments.

Referring to FIG. 8, the configuration illustrates that the first pattern region I is configured as a Bayer pattern, but embodiments are not limited thereto. That is, in other embodiments, the first pattern region I may be a tetra pattern, a nona pattern, or the like.

Although FIG. 8 illustrates that the Bayer pattern has only 16 filters in 4 rows and 4 columns, only some filters are illustrated for simplicity and conciseness, and embodiments are not limited thereto. That is, the number of filters of the Bayer pattern may be applied differently.

The Bayer pattern may include filters in three colors of red, green and blue. That is, an R filter R may be an optical filter that transmits only red (R) light, G filters Gr and Gb may be optical filters that transmit only green (G) light, and a B filter B may be an optical filter that transmits only blue (B) light. In the Bayer pattern, as shown in FIG. 8, the R, G and B filters R, Gb, Gr and B may be arranged to have a predetermined pattern. As shown in FIG. 8, the G filters may be arranged such that the G filter Gr is located next to the R filter R and the G filter Gb is located next to the B filter B.

That is, each color filter (e.g., R, Gr, Gb, or B) may form a region of a 1×1 matrix to form a Bayer pattern. According to some embodiments, the edge portion or second pattern region II of the color filter array 1010 of FIG. 7 may be configured as a tetra pattern as illustrated in FIG. 10.

Figure 9:
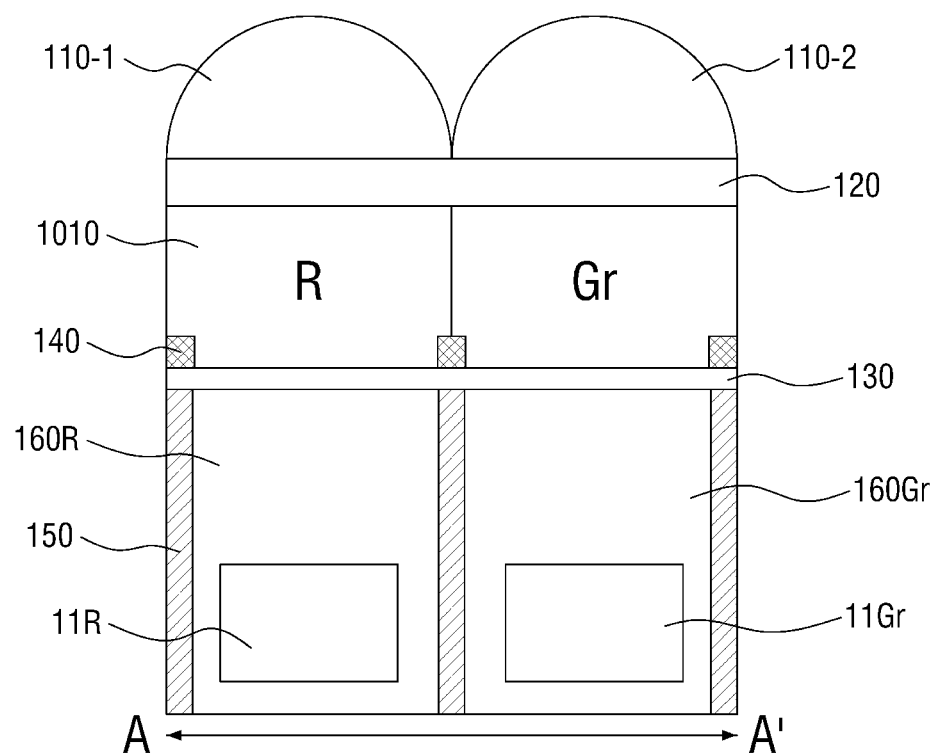
FIG. 9 is a cross-sectional view taken along line A-A' of the first pattern region I of FIG. 8.

FIG. 9 is a cross-sectional view taken along line A-A' of the first pattern region I of FIG. 8.

Referring to FIG. 9, an image sensor according to some embodiments includes substrates 160R and 160Gr, photoelectric transistors 11R and 11Gr, an antireflection film 150, a side antireflection film 140, color filters R and Gr, an upper planarization layer 120, a lower planarization layer 130, and microlenses 110-1 and 110-2, as illustrated in FIG. 9.

The substrates 160R and 160Gr may employ, for example, a P-type or N-type bulk substrate, or may employ a P-type bulk substrate on which a P-type or N-type epitaxial layer is grown, or may employ an N-type bulk substrate on which a P-type or N-type epitaxial layer is grown. In addition to the semiconductor substrates, the substrates 160R and 160Gr may also employ a substrate such as an organic plastic substrate.

According to various embodiments, the photoelectric transistors 11R and 11Gr may be photodiodes, phototransistors, photogates, pinned photodiodes, or a combination thereof.

The antireflection film 150 and the side antireflection film 140 may prevent light incident from the outside onto the microlenses 110-1 and 110-2 from penetrating into the R and Gr regions. The antireflection film 150 and the side antireflection film 140 may be formed of an insulating film such as a silicon oxide film, a silicon nitride film, a silicon oxynitride film, a resin, a combination thereof, or a stack thereof.

The upper planarization layer 120 and the lower planarization layer 130 may be formed to be flat with the color filters R and Gr interposed therebetween. The upper planarization layer 120 and the lower planarization layer 130 may include at least one of a silicon oxide-based material, a silicon nitride-based material, a resin, or a combination thereof.

FIG. 10 is an exemplary plan view illustrating the second pattern region II of the color filter array of FIG. 7, according to some embodiments.

Referring to FIG. 10, the second pattern region II of FIG. 7 may be configured as a tetra pattern. Although FIG. 10 illustrates that the tetra pattern has 16 filters in 4 rows and 4 columns, only some filters are illustrated for simplicity and conciseness, and embodiments are not limited thereto. That is, the number of filters of the tetra pattern may be applied differently.

The tetra pattern may include filters in three colors of red, green and blue. That is, an R filter R may be an optical filter that transmits only red (R) light, G filters Gr and Gb may be optical filters that transmit only green (G) light, and a B filter B may be an optical filter that transmits only blue (B) light.

In the tetra pattern, as shown in FIG. 10, the R, G and B filters R, Gb, Gr and B may be arranged to have a predetermined pattern. As shown in FIG. 10, the G filters may be arranged such that the G filter Gr is located next to the R filter R and the G filter Gb is located next to the B filter B.

That is, each color filter (e.g., R, Gr, Gb, or B) may form a region of a 2×2 matrix to form a tetra pattern. For example, as illustrated in FIG. 10, each color filter (e.g., R, Gr, Gb, or B) may form a 2×2 matrix, and four 2×2 matrices may be included in the tetra pattern. In the tetra pattern, the same color filters (e.g., R, Gr, Gb, or B) may be adjacent to each other to increase spatial similarity. Thus, it is possible to effectively reduce noise due to the binning performed by the binning unit to be described later.

The color filter array of the first pattern region I may have N×N (N is a natural number of 2 or more) repeated color filter pattern, and the color filter array of the second pattern region II may have M×M (M is a natural number of 2 or more) repeated color filter pattern. In this configuration, in some embodiments, the number of R color filters in each of the first pattern region I and the second pattern region II may be the same. Alternatively or additionally, in some other embodiments, the number of B color filters in each of the first pattern region I and the second pattern region II may be the same. Alternatively or additionally, in yet other embodiments, the number of G color filters in each of the first pattern region I and the second pattern region II may be the same.

Alternatively or additionally, in still other embodiments, the number of B color filters in the first pattern region I may be equal to the number of R color filters in the second pattern region II, and the number of R color filters in the first pattern region I may be equal to the number of B color filters in the second pattern region II, but embodiments are not limited thereto.

Figure 11:
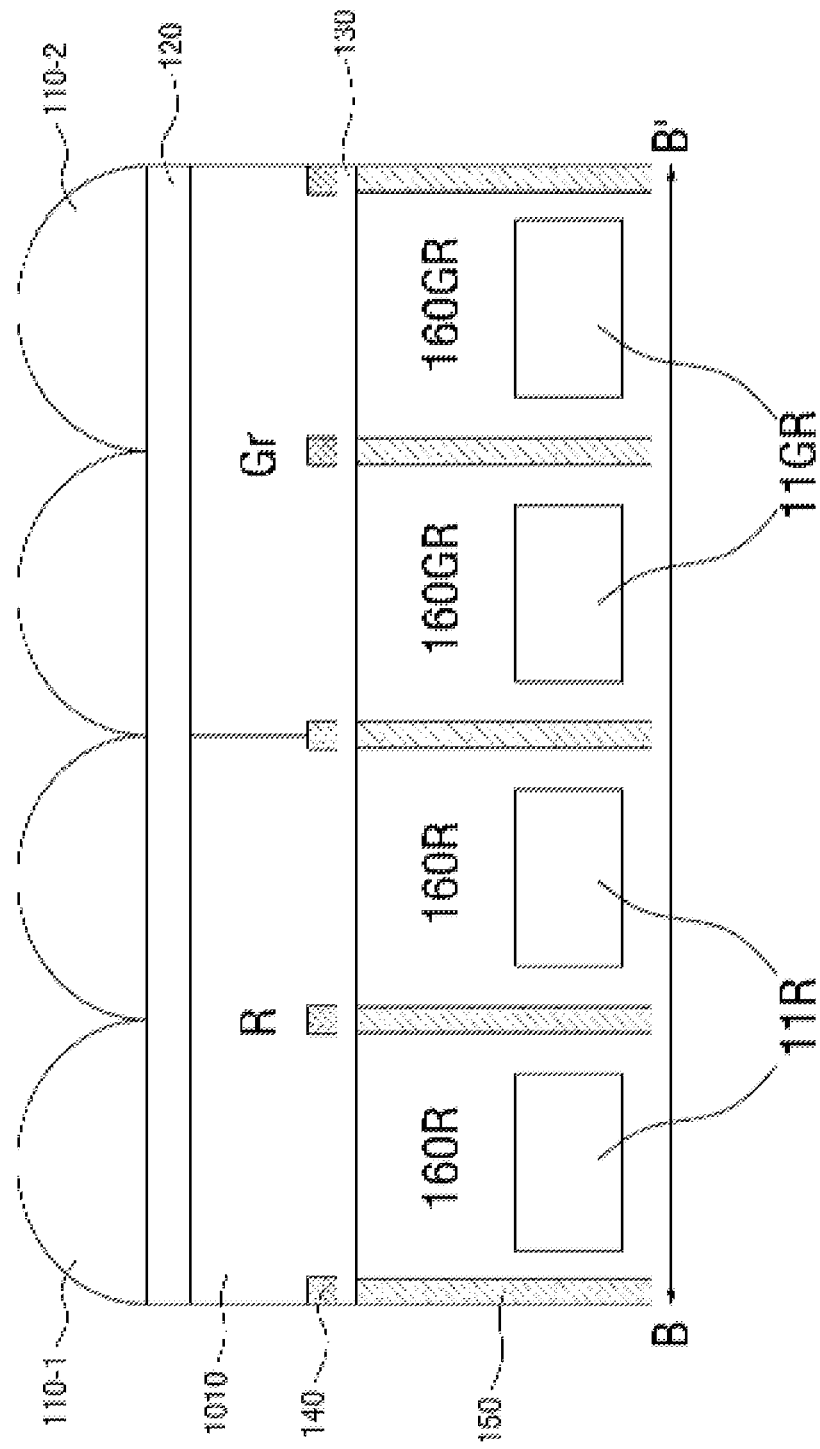
FIG. 11 is a cross-sectional view taken along line B-B' of the second pattern region II of FIG. 10.

FIG. 11 is a cross-sectional view taken along line B-B' of the second pattern region II of FIG. 10. Since the description is similar to the description of FIG. 9 and since both figures use like reference designators, repeated description thereof will be omitted for conciseness.

Figure 12:
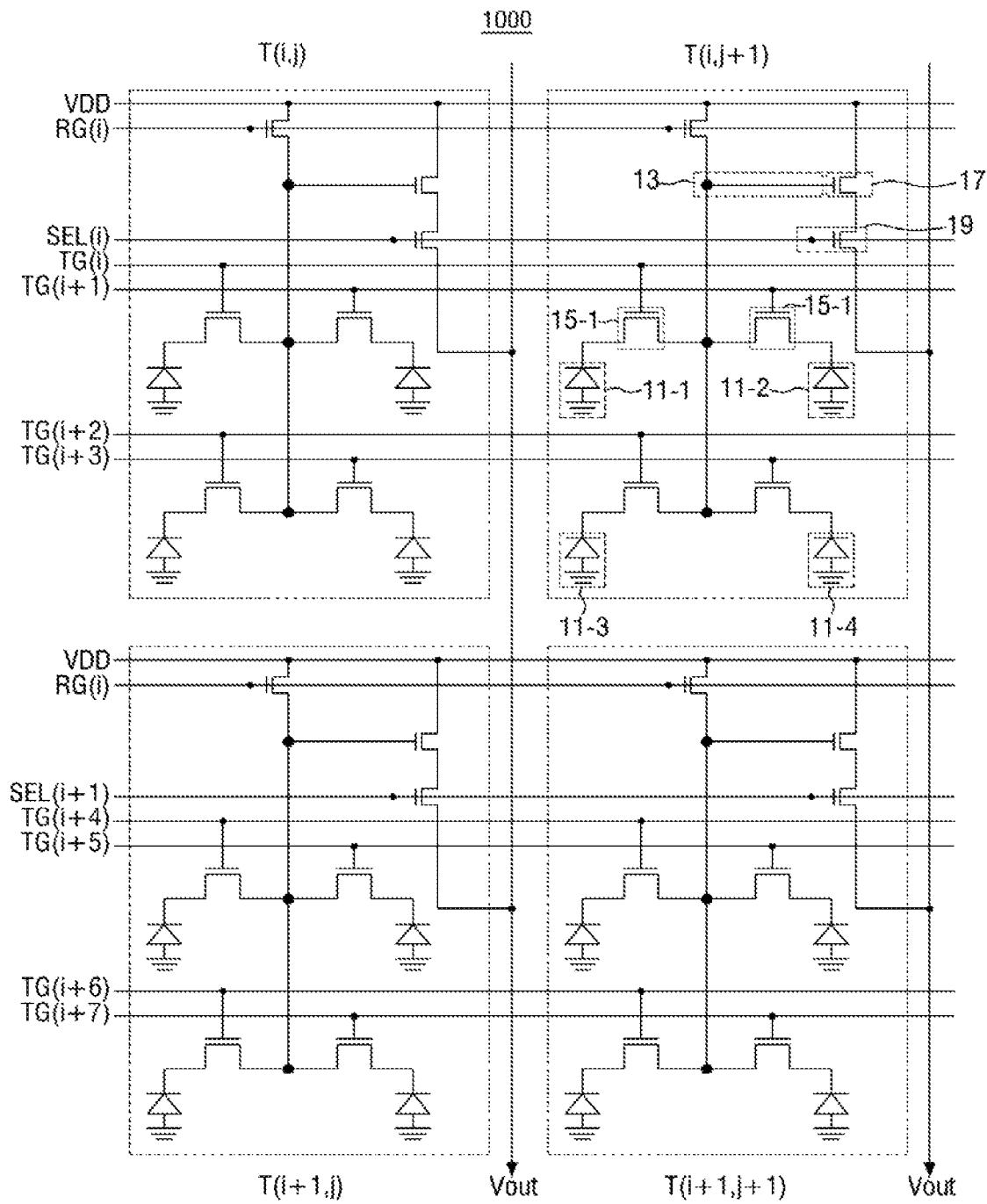
FIG. 12 is an exemplary circuit diagram illustrating a tetra pixel array, according to some embodiments.

FIG. 12 is an exemplary circuit diagram illustrating a tetra pixel array, according to some embodiments. Since the description is similar to the description of FIG. 5 and both figures use like reference designators, repeated description thereof will be omitted for conciseness, and the description that follows will focus mainly on the differences with FIG. 5.

Referring to FIG. 12, the color filter array may be formed as a Bayer pattern, and the structure of the pixel array 1000 may be changed to implement an image sensor having a tetra pattern. The photoelectric transistor 11 of FIG. 5 is provided as photoelectric transistors including a first photoelectric transistor 11-1, a second photoelectric transistor 11-2, a third photoelectric transistor 11-3, and a fourth photoelectric transistor 11-4, and the charge transfer transistor 15 of FIG. 5 is provided as a first charge transfer transistor 15-1, a second charge transfer transistor 15-2, a third charge transfer transistor 15-3, and a fourth charge transfer transistor, as illustrated in FIG. 12.

The drains of first to fourth charge transfer transistors 15-1 to 15-4 may be connected to each other and connected to the floating diffusion region 13 to implement a tetra pattern.

Figure 13:
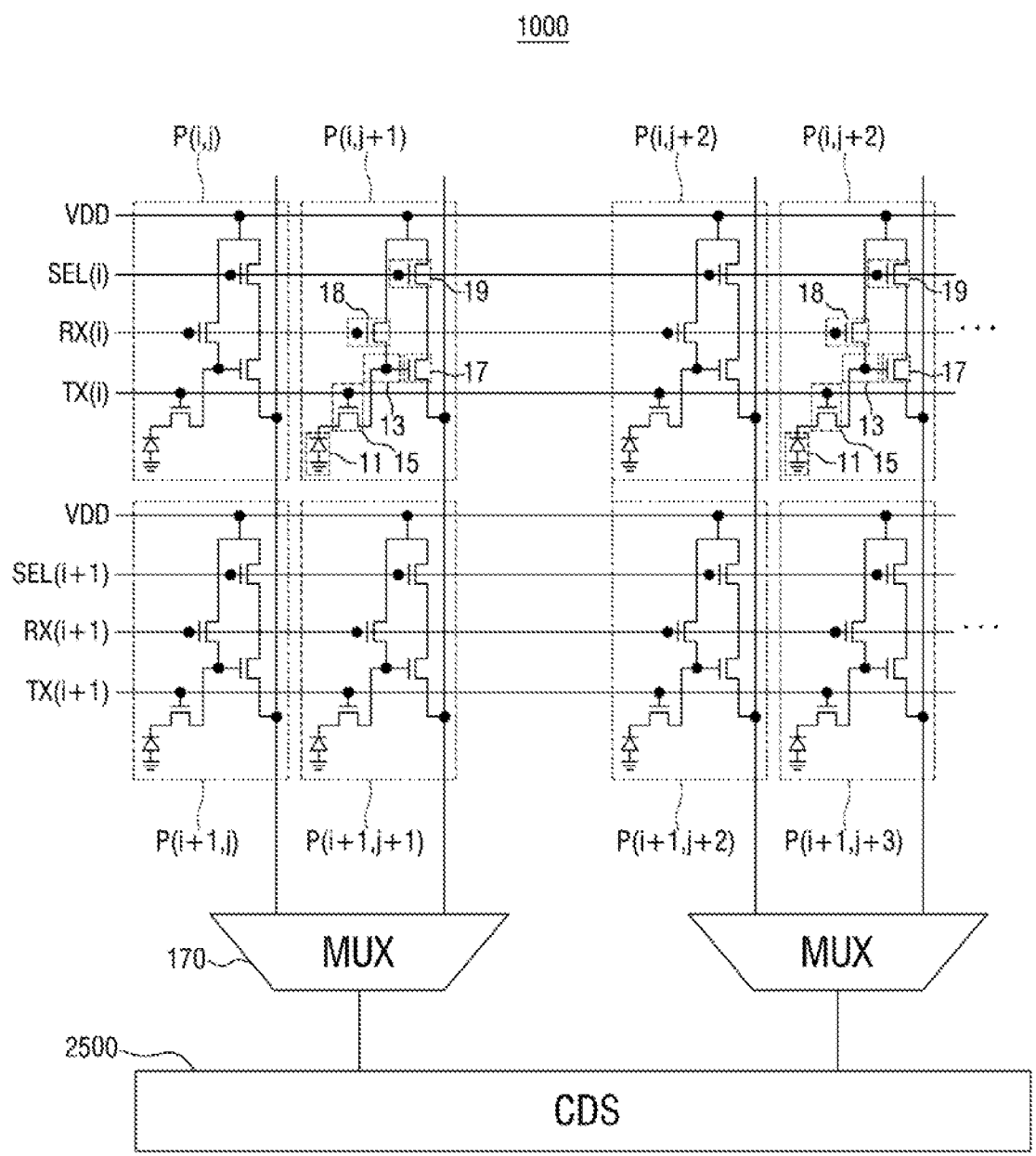
FIG. 13 is an exemplary circuit diagram using a Bayer pixel array as a tetra pattern; according to some embodiments.

FIG. 13 is an exemplary circuit diagram using a Bayer pixel array as a tetra pattern.

Referring to FIG. 13, after both of the color filter array and the pixel array are formed as a Bayer pattern, a MUX 170 may be disposed before the correlated double sampler 2500 to connect the Vout terminals of the respective pixels to form a tetra pattern.

The correlated double sampler 2500 may receive an output from the pixel array 1000 including the Bayer pattern and generate the same output as the pixel array 1000 including the tetra pattern.

Figure 14:
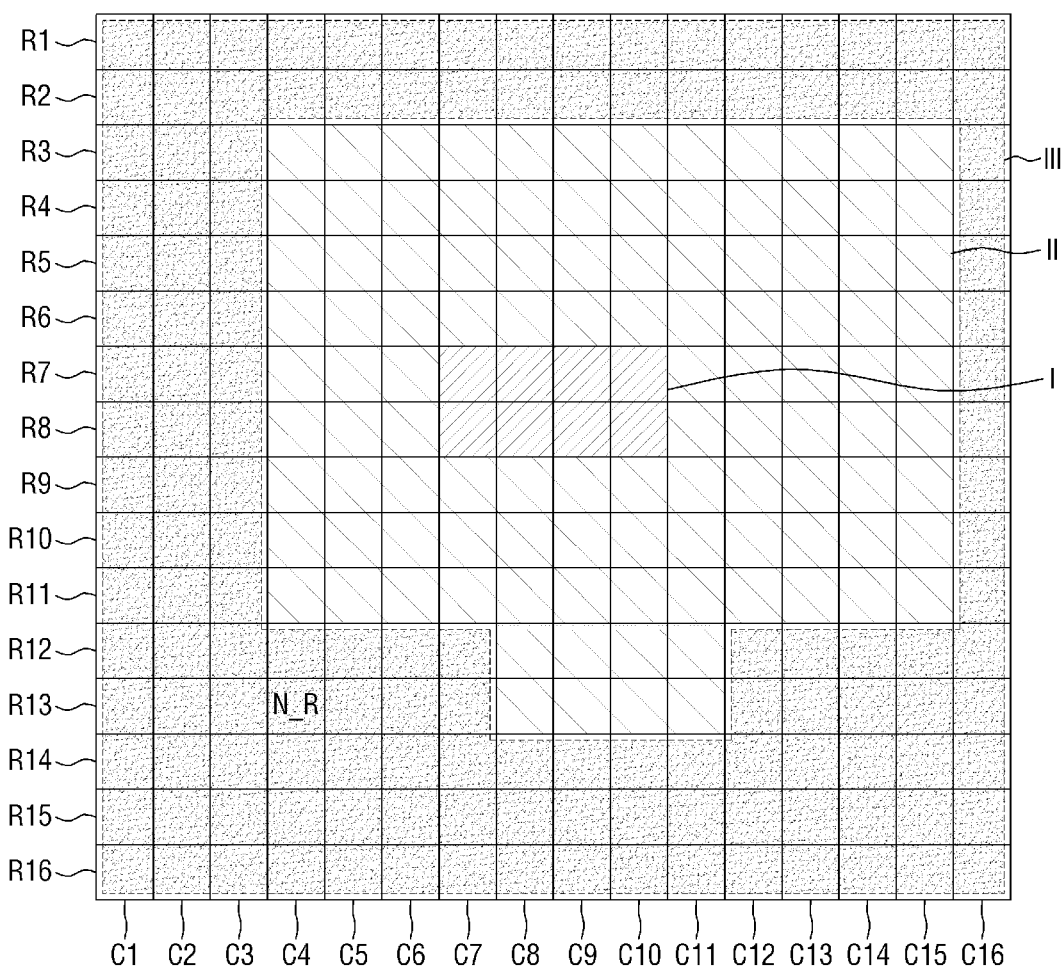
FIG. 14 is an exemplary conceptual diagram in plan view, explaining the color filter array of the image sensor of FIG. 4, according to some embodiments.

FIG. 14 is an exemplary conceptual diagram in plan view explaining the color filter array of the image sensor of FIG. 4, according to some embodiments. For reference, a color filter array 1020 may further include a third pattern region III in addition to the first pattern region I and the second pattern region II of the color filter array of FIG. 7. For example, the third pattern region III may surround the second pattern region II of the color filter array of FIG. 7. It is assumed that the first pattern region I and the second pattern region II illustrated in FIG. 14 are configured as a Bayer pattern and a tetra pattern, respectively, as shown in the color filter array of FIG. 7. The first pattern region I and the second pattern region II are similar to those illustrated and described with reference to FIG. 7, and thus mainly the third pattern region III will be described for conciseness. The pattern of each pattern region of a color filter array 1020 of FIG. 14 may include various combinations without being limited thereto.

Referring to FIG. 14, the color filter array 1020 may include a first pattern region I forming a central portion and a second pattern region II surrounding the first pattern region I, and a third pattern region III forming an edge portion corresponding to a remaining portion of the color filter array 1020 other than the first pattern region I and the second pattern region II. The shapes of each of the first pattern region I, the second pattern region II, and the third pattern region III illustrated in FIG. 14 are only examples and, in other embodiments, the shapes may be varied, as long as the first pattern region I forms a central portion, the second pattern region II surrounds the first pattern region I and the third pattern region III surrounds the second pattern region II to form an edge portion of the color filter array 1020.

Although an array of 256 color filters on a pixel array of 16 rows and 16 columns is shown in FIG. 14, only some color filters is illustrated for simplicity and conciseness, and embodiments are not limited thereto. The number of filters in the color filter array 1020 may be applied differently. For example, it is noted that the color filter array 1020 of FIG. 14 assumes a corresponding pixel array 1000 of 16 rows and 16 columns, i.e., including rows R1 to R16 and columns C1 to C16.

The color filters of the color filter array 1020 may be disposed on the pixel array 1000 and connected to row signal lines R1 to R16 and column signal lines C1 to C16. The first pattern region I of the color filter array 1020 according to some embodiments may be configured as a Bayer pattern as shown in FIG. 8. Further, the second pattern region II of the color filter array 1020 according to some embodiments may be configured as a tetra pattern as illustrated in FIG. 10. The third pattern region III of the color filter array 1020 according to some embodiments may be configured as a nona pattern as illustrated in FIG. 15.

FIG. 15 is an exemplary plan view illustrating a third pattern region III of the color filter array of FIG. 14, according to some embodiments.

Although FIG. 15 illustrates that the nona pattern has 36 filters in 6 rows and 6 columns, only some filters are illustrated for simplicity and conciseness, and embodiments are not limited thereto. That is, the number of filters of the nona pattern may be applied differently.

The nona pattern may include filters in three colors of red, green and blue. That is, an R filter R may be an optical filter that transmits only red (R) light, G filters Gr and Gb may be optical filters that transmit only green (G) light, and a B filter B may be an optical filter that transmits only blue (B) light. In the nona pattern, as shown in FIG. 15, the R, G and B filters R, Gb, Gr and B may be arranged to have a predetermined pattern. As shown in FIG. 15, the G filters may be arranged such that the G filter Gr is located next to the R filter R and the G filter Gb is located next to the B filter B.

That is, each color filter (e.g., R, Gr, Gb, or B) may form a region of a 3×3 matrix to form a nona pattern. For example, as illustrated in FIG. 15, each color filter (e.g., R, Gr, Gb, or B) may form a 3×3 matrix, and four 3×3 matrices may be included in the nona pattern. In the nona pattern, the same color filters (e.g., R, Gr, Gb, or B) may be adjacent to each other to increase spatial similarity. Thus, it is possible to effectively reduce noise due to the binning performed by the binning unit to be described later. The number of pattern regions included in the color filter array 1020 according to some embodiments is not limited thereto.

In addition, the type of pattern corresponding to each pattern region of the color filter array 1020 is not limited thereto. For example, in the color filter array 1020 of FIG. 14, in some other embodiments the first pattern region I may be configured as a tetra pattern, the second pattern region II may be configured as a nona pattern, and the third pattern region III may be configured as a hexa-deca pattern.

Figure 16:
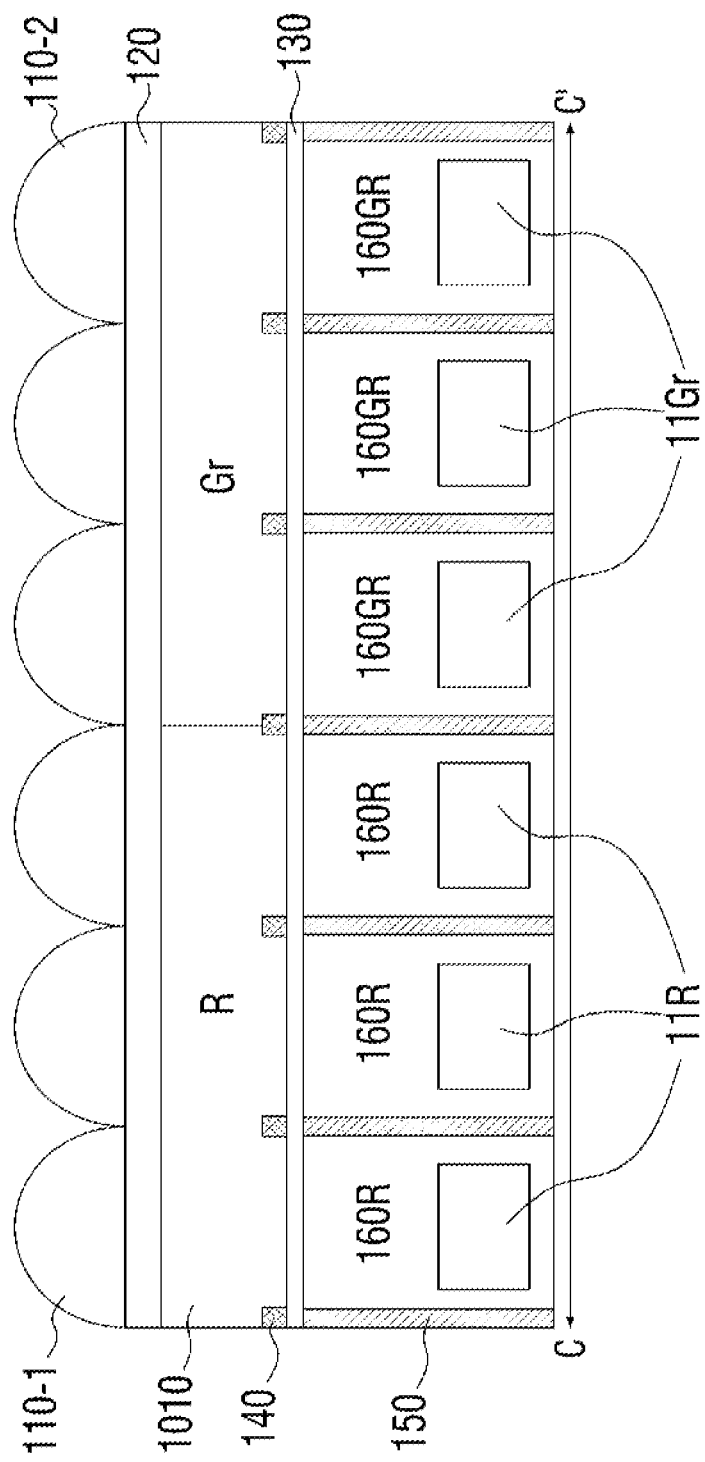
FIG. 16 is a cross-sectional view taken along line C-C' of the third pattern region III of FIG. 15.

FIG. 16 is a cross-sectional view taken along line C-C' of third pattern region III of FIG. 15.

Since the description is similar to the description of FIGS. 9 and 11, and since FIG. 16 uses like reference designators to FIGS. 9 and 11, repeated description thereof will be omitted for conciseness.

Figure 17:
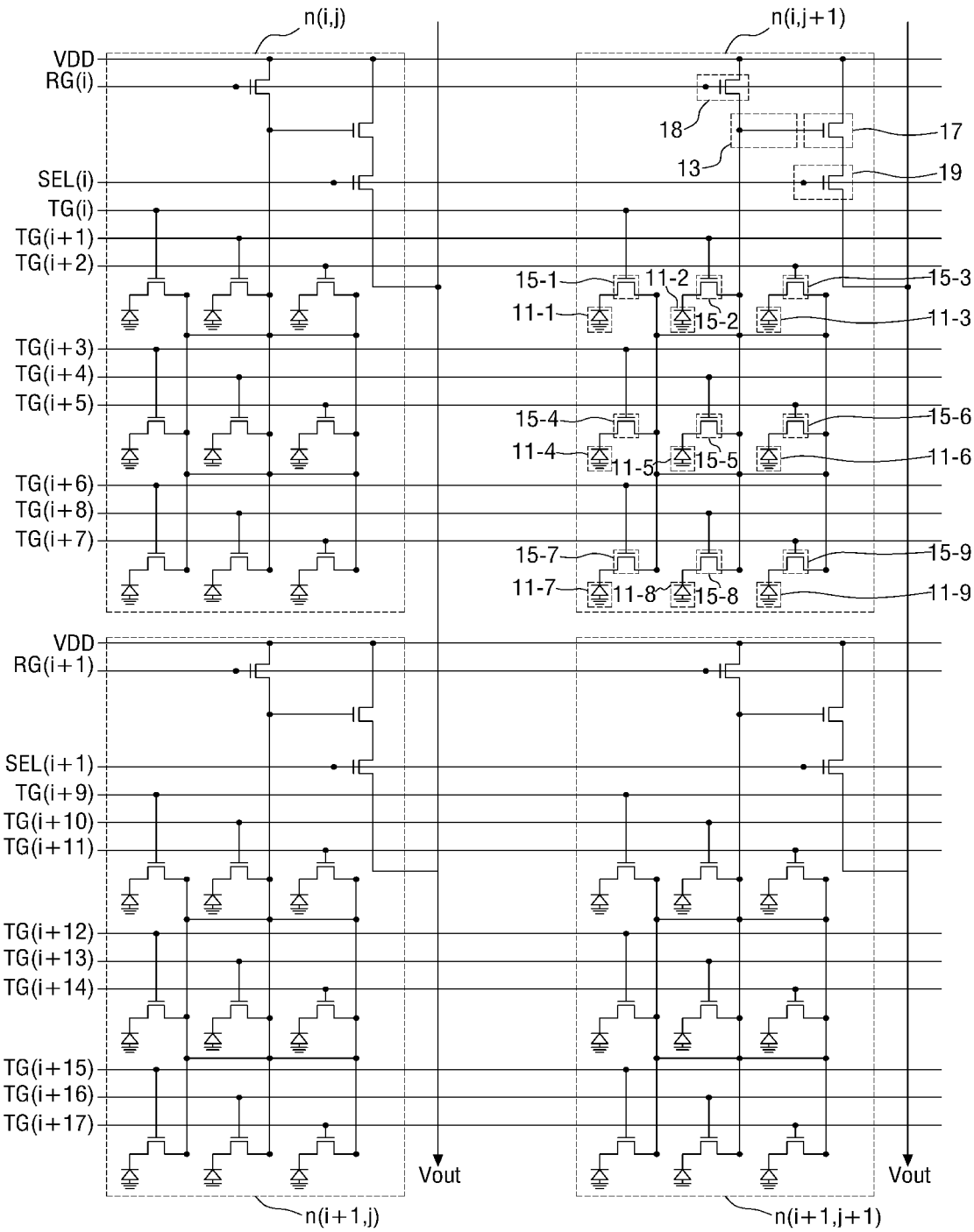
FIG. 17 is an exemplary circuit diagram illustrating a nona pixel array, according to some embodiments.

FIG. 17 is an exemplary circuit diagram illustrating a nona pixel array, according to some embodiments. Since the description is similar to the description of FIGS. 5 and 12 and since FIG. 17 uses like reference designators to FIGS. 5 and 12, repeated description thereof will be omitted for conciseness, and the description that follows will focus mainly on the differences with FIG. 5.

The photoelectric transistor 11 of FIG. 5 is provided as photoelectric transistors including a first photoelectric transistor 11-1, a second photoelectric transistor 11-2, a third photoelectric transistor 11-3, a fourth photoelectric transistor 11-4, a fifth photoelectric transistor 11-5, a sixth photoelectric transistor 11-6, a seventh photoelectric transistor 11-7, an eighth photoelectric transistor 11-8, and a ninth photoelectric transistor 11-9, and the charge transfer transistor 15 of FIG. 5 is provided as a first charge transfer transistor 15-1, a second charge transfer transistor 15-2, a third charge transfer transistor 15-3, a fourth charge transfer transistor 15-4, a fifth charge transfer transistor 15-5, a sixth charge transfer transistor 15-6, a seventh charge transfer transistor 15-7, an eighth charge transfer transistor 15-8, and a ninth charge transfer transistor 15-9, as illustrated in FIG. 12. Referring to FIG. 17, the drains of first to ninth charge transfer transistors 15-1 to 15-9 may be connected to the floating diffusion region 13 form a nona pixel array. In this case, the color filter array may have a Bayer pattern.

Figure 18:
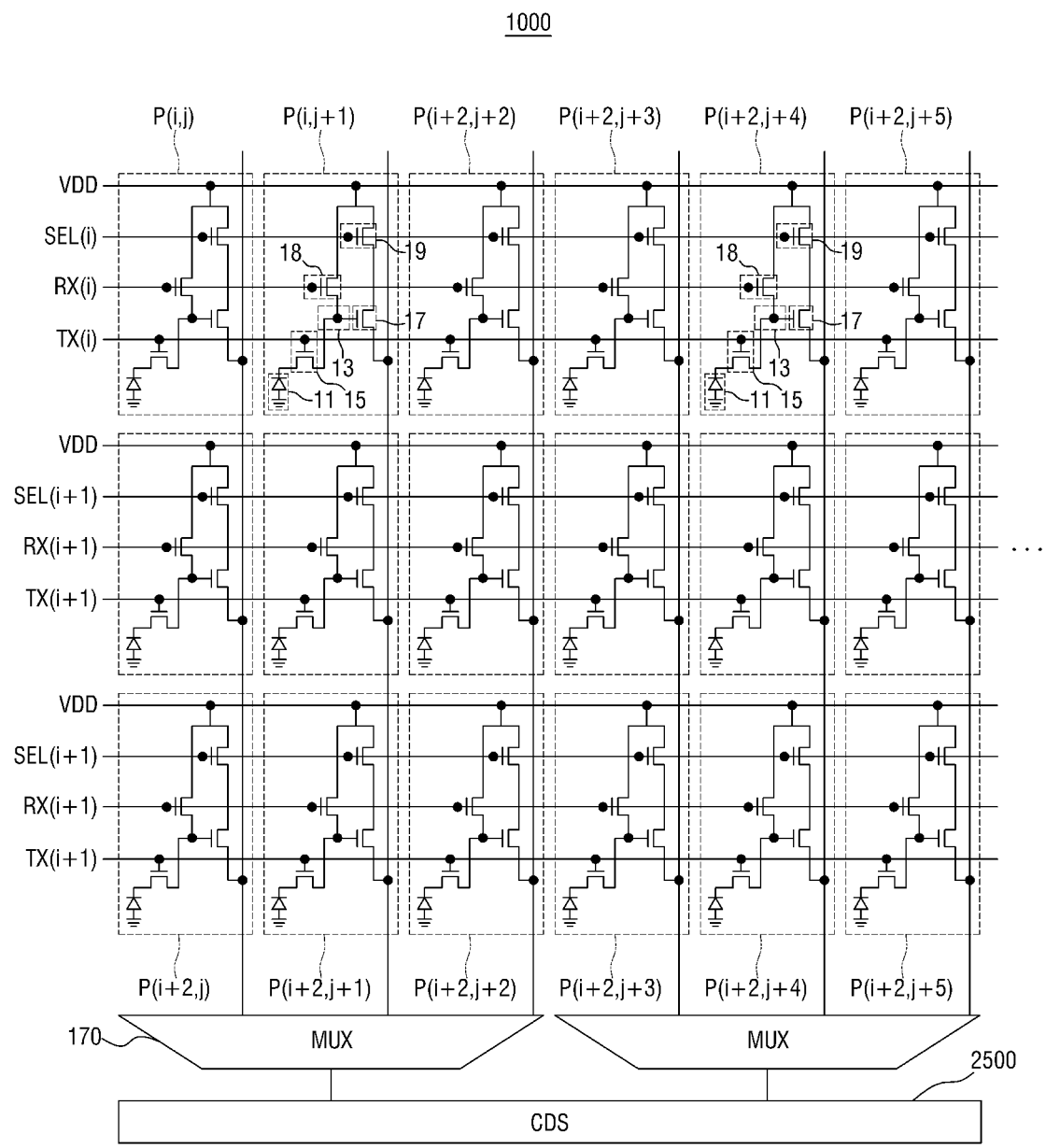
FIG. 18 is an exemplary circuit diagram using a Bayer pixel array as a nona pattern, according to some embodiments.

FIG. 18 is an exemplary circuit diagram using a Bayer pixel array as a nona pattern, according to some embodiments.

Referring to FIG. 18, the output line Vout of the pixel array may be connected to a MUX 170 to form a nona pattern.

The correlated double sampler 2500 may receive an output of the pixel array 1000 including the Bayer pattern through the MUX 170 to generate the same output as the non-pattern pixel array 1000.

Figure 19:
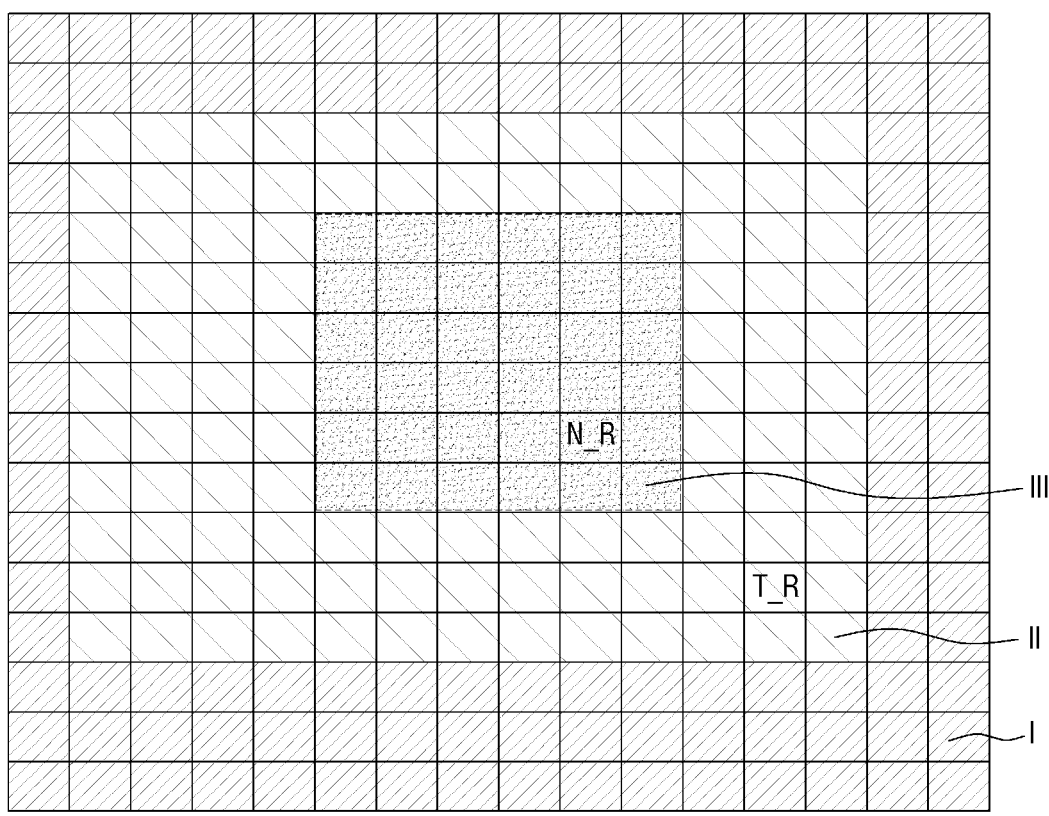
FIG. 19 is an exemplary plan view illustrating a color filter array of the image sensor of FIG. 4, according to some embodiments.

FIG. 19 is an exemplary plan view illustrating a color filter array of the image sensor of FIG. 4 according to some embodiments.

Referring to FIG. 19, a color filter array 1030 may include a nona pattern (III) located at the center, a tetra pattern (II) surrounding the nona pattern, and a Bayer pattern (I) surrounding the tetra pattern. However, the pattern arrangement in the color filter array of FIG. 19 is not be limited thereto. For example, in other embodiments, a tetra pattern may be located at the center, a nona pattern may surround the tetra pattern, and a Bayer pattern may surround the nona pattern.

The color filter array of the first pattern region I may have N×N (N is a natural number of 2 or more) color filter pattern, the color filter array of the second pattern region II may have M×M (M is a natural number of 2 or more) color filter pattern, and the color filter array of a third pattern region III may have T×T (T is a natural number of 2 or more) color filter pattern. In this configuration, in some embodiments the number of R color filters in each of the first pattern region I, the second pattern region II, and the third pattern region III may be the same. Alternatively or additionally, in some other embodiments, the number of B color filters in each of the first pattern region I, the second pattern region II, and the third pattern region III may be the same. Alternatively or additionally, in yet some other embodiments, the number of G color filters in each of the first pattern region I, the second pattern region II, and the third pattern region III may be the same.

Alternatively or additionally, in still some other embodiments, the number of B color filters in the first pattern region I may be equal to the number of R color filters in the second pattern region II, and the number of R color filters in the first pattern region I may be equal to the number of B color filters in the second pattern region II, but embodiments are not limited thereto.

Figure 20:
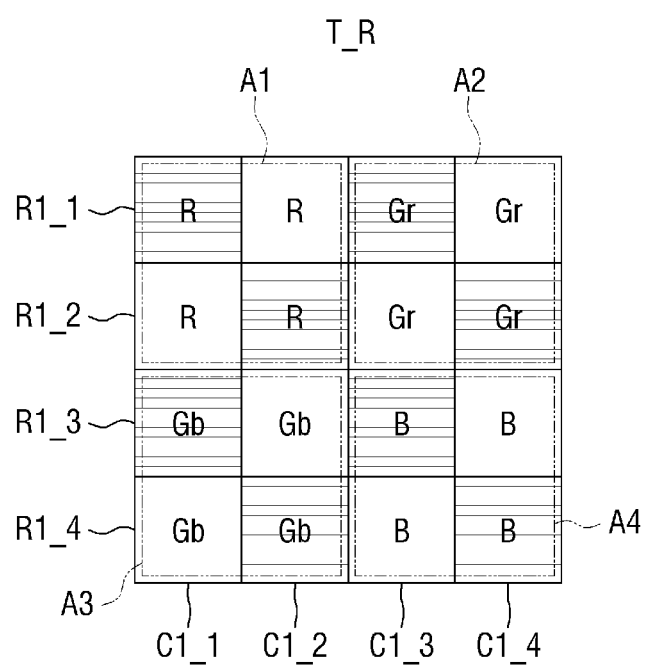
FIG. 20 is an exemplary plan view illustrating a binning operation for a tetra pattern according to some embodiments.
Figure 21:
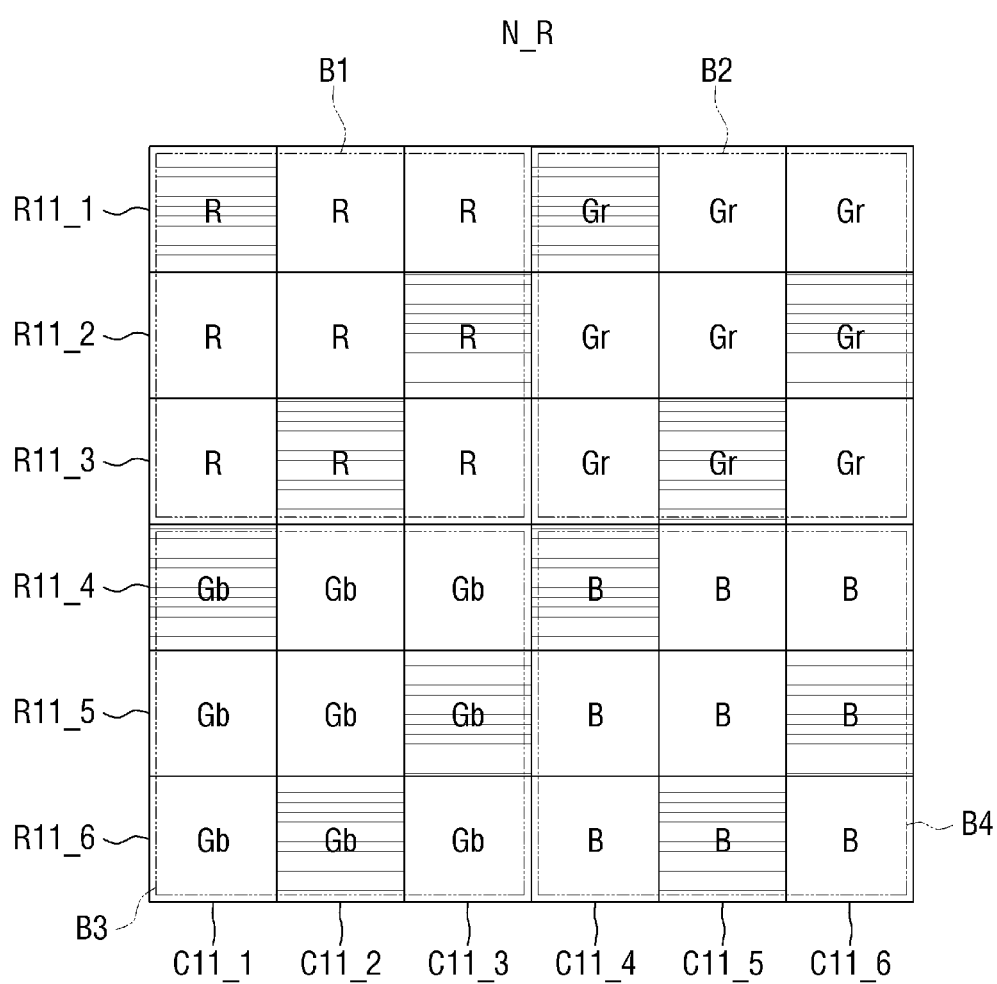
FIG. 21 is an exemplary plan view illustrating a binning operation for a nona pattern according to some embodiments.

FIG. 20 is an exemplary plan view illustrating a binning operation for a tetra pattern according to some embodiments. FIG. 21 is an exemplary plan view illustrating a binning operation for a nona pattern according to some embodiments.

Referring to FIGS. 3 and 20, the binning unit 200 in the image signal processor 300 may perform binning on the image information Img_Inf received from the image sensor 100. That is, for example, the image signal processor 300 may execute computer code to perform binning on the image information Img_Inf, or control a hardware binning unit to perform the binning. Alternatively, a hardware binning unit may be configured to perform the binning itself.

The binning unit 200 may determine brightness information (e.g., illuminance or luminance) of a current frame in the capture signal Cap_sig received from the application processor 400. The capture signal Cap_sig may include, for example, an exposure time for exposing light to the image sensor 100 to capture an image of a subject, an analog gain, and/or a digital gain. However, the information included in the capture signal Cap_sig is not limited thereto. That is, the application processor 400 may output the capture signal Cap_sig by adjusting the exposure time, analog gain, or digital gain used to capture an image.

For example, the application processor 400 may output the capture signal Cap_sig having a relatively low exposure time, analog gain, and/or digital gain in a bright environment such as daytime. As another example, the application processor 400 may output a capture signal Cap_sig having a relatively high exposure time, analog gain, and/or digital gain in a dark environment such as nighttime.

The binning unit 200 may determine whether binning is performed by determining whether the amount of light (e.g., illuminance or luminance) of the current frame is sufficient based on the capture signal Cap_sig. For example, the binning unit 200 may determine not to perform binning if it is determined that the amount of light (e.g., illuminance or luminance) of the current frame is sufficient. For example, the binning unit 200 may determine not to perform binning if the amount of light of the current frame is greater than or equal to a binning threshold. As another example, the binning unit 200 may determine to perform binning if it is determined that the amount of light (e.g., illuminance or luminance) of the current frame is insufficient. For example, the binning unit 200 may determine to perform binning if the amount of light of the current frame is less than the binning threshold.

Referring to FIGS. 3 and 20, in each of a first block region A1, a second block region A2, a third block region A3 and a fourth block region A4 including the respective color filter pattern in the tetra pattern, imaging may be performed using only pixel region information on some filters. For example, in the first block region A1, only an output of a first row R1 and a first column C1 and an output of a second row R2 and a second column C2 may be used for imaging (as illustrated by shading in FIG. 20), and the entire first block region A1 may be used as pixels for the red filter R. Similarly, in the second block region A2, only an output of a first row R1 and a third column C3 and an output of a second row R2 and a fourth column C4 may be used for imaging (as illustrated by shading in FIG. 20), and the entire second block region A2 may be used as pixels for the green filter Gr. The similar concept may apply to the third block region A3 and the fourth block region A4. By performing binning as described with respect to FIGS. 3 and 20, it is possible to dramatically improve an operation speed of the image sensor by reducing the amount of transmission data, and increase a signal-to-noise ratio (SNR) of the image sensor.

Referring to FIGS. 3 and 21, in each of a first block region B1, a second block region B2, a third block region B3 and a fourth block region B4 including the respective color filter pattern in the nona pattern, imaging may be performed using only pixel region information on some filters. For example, in the first block region B1, only an output of an eleventh row R11 and a second column C2, a twelfth row R12 and a fourth column C4, and a thirteenth row R13 and a third column C3 may be used for imaging (as illustrated by shading in FIG. 21), and the entire first block region B1 may be used as pixels for the red filter R. Similarly, in the second block region B2, only an output of the eleventh row R11 and a fifth column C5, the twelfth row R12 and a sixth column C6, and the thirteenth row R13 and a seventh column C7 may be used for imaging (as illustrated by shading in FIG. 21), and the entire second block region B2 may be used as pixels for the green filter Gr. The similar concept applies to the third block region B3 and the fourth block region B4. By performing binning on first to fourth block regions B1 to B4 of FIG. 21 similarly to FIG. 20, it is possible to increase the signal-to-noise ratio (SNR).

While various exemplary embodiments have been illustrated and described above, it will be apparent to those of ordinary skill in the art that various changes and modifications may be made thereto without departing from the spirit and scope of the inventive concept as set forth in the following claims.

What is claimed is:

1. An image device comprising:
   a pixel array comprising a first pixel array portion of a part of the pixel array and a second pixel array portion of another part of the pixel array that outputs an image; and
   a color filter array disposed over the pixel array, the color filter array comprising a first color filter pattern that is repeated on the first pixel array portion and a second color filter pattern that is repeated on the second pixel array portion, each of the first color filter pattern and the second color filter pattern including a plurality of different color filters, each located adjacent to another color filter,
   wherein the plurality of different color filters included in the first color filter pattern is arranged in an array of N×N, the plurality of different color filters included in the second color filter pattern is arranged in an array of M×M, each of N and M is a natural number of 2 or more, and
   wherein a number of red color filters included in the first color filter pattern is equal to a number of red color filters included in the second color filter pattern.

2. The image device of claim 1, further comprising:
   a binning unit configured to selectively perform binning on the image based on an amount of light in a current frame of the image.

3. The image device of claim 1, wherein a number of blue color filters included in the first color filter pattern is equal to a number of blue color filters included in the second color filter pattern.

4. The image device of claim 3, wherein the number of the blue color filters included in the first color filter pattern is equal to the number of the red color filters included in the second color filter pattern.

5. The image device of claim 1, wherein a number of green color filters included in the first color filter pattern is equal to a number of green color filters included in the second color filter pattern.

6. The image device of claim 5, wherein the number of the green color filters included in the first color filter pattern is equal to a number of blue color filters included in the second color filter pattern.

7. The image device of claim 1, wherein the first color filter pattern is located at a center of the color filter array, and the second color filter pattern surrounds the first color filter pattern.

8. The image device of claim 7, wherein a plurality of first pixels of the pixel array corresponding to the first color filter pattern of the color filter array are configured as a Bayer pattern, and a plurality of second pixels of the pixel array corresponding to the second color filter pattern of the color filter array are configured as a tetra pattern.

9. The image device of claim 1, wherein the color filter array further comprises:
   a third color filter pattern different from the first color filter pattern and the second color filter pattern.

10. The image device of claim 9, wherein the third color filter pattern is located at a center of the color filter array, the second color filter pattern surrounds the third color filter pattern, and the first color filter pattern surrounds the second color filter pattern.

11. The image device of claim 10, wherein a plurality of first pixels of the pixel array corresponding to the first color filter pattern of the color filter array are configured as a Bayer pattern, a plurality of second pixels of the pixel array corresponding to the second color filter pattern of the color filter array are configured as a tetra pattern, and a plurality of third pixels of the pixel array corresponding to the third color filter pattern of the color filter array are configured as a nona pattern.

12. An image device comprising:
a pixel array comprising a first pixel array portion of a center of the pixel array and a second pixel array portion of a surrounding the center of the pixel array;
a color filter array disposed on top of the pixel array, the color filter array comprising a first pattern region corresponding to the first pixel array portion and a second pattern region corresponding to the second pixel array portion, the first pattern region including a first color filter pattern having a first pattern and the second pattern region including a second color filter pattern having a second pattern different from the first pattern, each of the first color filter pattern and the second color filter pattern including color filters that are located adjacent to each other,
wherein the first color filter pattern is arranged in an array of N×N repeated color filter pattern, and the second color filter pattern is arranged in an array of M×M repeated color filter pattern,
wherein N is a natural number greater than 1, and M is a natural number greater than N, and
wherein each of the first pattern region includes red color filters and the second pattern region includes blue color filters.

13. The image device of claim 12, wherein M is 4.

14. The image device of claim 13, wherein the first pattern region is a standard color filter array.

15. The image device of claim 14, wherein the standard color filter array has a Bayer pattern.

16. The image device of claim 12, wherein M is 6.

17. The image device of claim 12, wherein M is 8.

18. The image device of claim 12, wherein M is 2×N.

19. The image device of claim 12, wherein the pixel array further comprises:
a third pixel array portion of a surrounding the second pixel array portion, and
wherein the color filter array further comprises:
a third pattern region corresponding to the third pixel array portion, the third pattern region including a third color filter pattern having a third pattern different from the first pattern and the second pattern.

20. An image device comprising:
a pixel array; and
a color filter array disposed on top of the pixel array, the color filter array comprising a first pattern region located at a center and having a first pattern, a second pattern region surrounding the first pattern region and having a second pattern different from the first pattern, and a third pattern region surrounding the second pattern region and having a third pattern different from the first pattern and the second pattern,
wherein the first pattern region includes an array of N×N repeated color filter pattern, the second pattern region includes an array of M×M repeated color filter pattern, and the third pattern region includes an array of T×T repeated color filter pattern, and
wherein each of N, M and T is a natural number greater than 1, and
wherein each of the array of N×N repeated color filter pattern, the array of M×M repeated color filter pattern and the array of T×T repeated color filter pattern includes color filters that are located adjacent to each other.

* * * * *